United States Patent
Shilo

(10) Patent No.: US 10,140,502 B1
(45) Date of Patent: Nov. 27, 2018

(54) SELECTING DATA ITEMS USING BIOMETRIC FEATURES

(71) Applicant: Conduit LTD, Nes Ziona (IL)

(72) Inventor: Ronen Shilo, Gedra (IL)

(73) Assignee: CONDUIT LTD, Nes Ziona (IL)

( * ) Notice: Subject to any disclaimer, the term of this patent is extended or adjusted under 35 U.S.C. 154(b) by 0 days.

(21) Appl. No.: 15/895,398

(22) Filed: Feb. 13, 2018

(51) Int. Cl.
| | |
|---|---|
| *H04M 1/66* | (2006.01) |
| *G06F 7/04* | (2006.01) |
| *G06F 3/041* | (2006.01) |
| *G06F 3/048* | (2013.01) |
| *G06Q 40/00* | (2012.01) |
| *G06K 9/00* | (2006.01) |
| *G06F 3/033* | (2013.01) |
| *G06F 21/32* | (2013.01) |
| *G07C 9/00* | (2006.01) |
| *H04L 9/32* | (2006.01) |

(52) U.S. Cl.
CPC ....... *G06K 9/00087* (2013.01); *G06F 3/0416* (2013.01); *G06F 21/32* (2013.01); *G07C 9/00158* (2013.01); *H04L 9/3231* (2013.01)

(58) Field of Classification Search
CPC .. H04M 1/66; G06F 7/04; G06F 3/041; G06F 3/048
USPC .................. 340/5.83, 407.2; 455/410, 575.1; 345/173; 715/810, 702; 235/379
See application file for complete search history.

(56) References Cited

U.S. PATENT DOCUMENTS

| | | | | |
|---|---|---|---|---|
| 6,141,436 A | * | 10/2000 | Srey .................... | G06K 9/00013 340/5.74 |
| 6,307,956 B1 | * | 10/2001 | Black .................. | G06F 3/03545 382/124 |
| 6,603,462 B2 | * | 8/2003 | Matusis ................ | G06F 3/0219 340/5.83 |
| 7,697,729 B2 | * | 4/2010 | Howell .............. | G06K 9/00013 345/156 |

(Continued)

FOREIGN PATENT DOCUMENTS

WO 2017020388 2/2017

OTHER PUBLICATIONS

Colley et al., "Exploring Finger Specific Touch Screen Interaction for Mobile Phone User Interfaces," URL: <<https://www.researchgate.net>>, publication/273258528_Exploring_Finger_Specific_Touch_Screen_Interaction_for_Mobile_Phone_User_Interfaces, Dec. 2014, updated Dec. 2017.

(Continued)

*Primary Examiner* — Nam V Nguyen
(74) *Attorney, Agent, or Firm* — Myers Wolin, LLC

(57) ABSTRACT

A biometric feature of a user is obtained. Based on the biometric feature, a data item is selected from a plurality of data items, wherein each item in the plurality of data items is associated with a different biometric feature. The data item is used, such as in a program as part of an operation that depends on the current context of the program. Additionally or alternatively, an apparatus comprises a peripheral device for obtaining a biometric feature of a user; a memory retaining a plurality of data items, wherein each item in the plurality of data items is associated with a different biometric feature; a processor configured to select a data item from the plurality of data items, wherein the selection is based on the biometric feature; and wherein said processor is further configured to utilize the data item.

24 Claims, 5 Drawing Sheets

(56) References Cited

U.S. PATENT DOCUMENTS

| | | | |
|---|---|---|---|
| 8,081,171 B2* | 12/2011 | Adams | G06F 3/0321 |
| | | | 178/19.01 |
| 8,224,392 B2 | 7/2012 | Kim | |
| 8,284,168 B2 | 10/2012 | Terada | |
| 8,358,200 B2* | 1/2013 | Madhvanath, Sr. | |
| | | | G06F 3/03547 |
| | | | 340/5.52 |
| 8,910,861 B2* | 12/2014 | Wadia | G06Q 20/40145 |
| | | | 235/379 |
| 9,075,462 B2 | 7/2015 | Sauer | |
| 9,900,422 B2* | 2/2018 | Lee | H04M 1/72563 |
| 9,928,413 B2* | 3/2018 | Baca | G06F 21/00 |
| 2003/0128240 A1* | 7/2003 | Martinez | G06K 9/00026 |
| | | | 715/764 |
| 2004/0085300 A1 | 5/2004 | Matusis | |
| 2005/0085217 A1* | 4/2005 | Lim | H04M 1/66 |
| | | | 455/410 |
| 2009/0169070 A1* | 7/2009 | Fadell | G06F 21/32 |
| | | | 382/124 |
| 2010/0231356 A1 | 9/2010 | Kim | |
| 2011/0227831 A1 | 9/2011 | Mills | |
| 2015/0070284 A1 | 3/2015 | Clausen | |
| 2015/0293651 A1 | 10/2015 | Han | |
| 2015/0324570 A1* | 11/2015 | Lee | G06K 9/3208 |
| | | | 382/124 |
| 2016/0177542 A1* | 6/2016 | Johannsen | G07C 5/0808 |
| | | | 701/34.4 |
| 2018/0144111 A1* | 5/2018 | Katingari | G06F 3/0416 |

OTHER PUBLICATIONS

Suzuki et al., "A Potential Exploration of Finger-Specific Interaction,", URL: <<http://www.iplab.cs.tsukuba.ac.jp/paper/international/apchi2012_FSI.pdf>>, Aug. 28-31, 2012, Shimane, Japan.

* cited by examiner

SELECTING DATA ITEMS USING BIOMETRIC FEATURES

TECHNICAL FIELD

The present disclosure relates to user interfaces in general, and to user interfaces that utilize biometric features, in particular.

BACKGROUND

An input device is a peripheral used to provide data and control signals to an information processing system such as a computer or other information appliance. The peripheral may be a hardware equipment, integral to a computing device or coupled thereto.

Input devices can be classified according to their modality of input (e.g., mechanical motion, audio, visual, etc.), number of degrees of freedom involved, and the type of digital or analogue input. For example, a touchscreen is an electronic visual display that can detect the presence and location of a touch (e.g., of a finger, hand, or a stylus) within the display area. A touchpad (or trackpad) is a pointing device featuring a tactile sensor, a specialized surface that can translate the motion and position of a user's fingers to a relative position on screen. A mouse is a pointing device that functions by detecting two-dimensional motion relative to its supporting surface. The mouse's motion typically translates into the motion of a pointer on a display, which allows for fine control of a graphical user interface.

Input devices can interact with graphical user interfaces directly (e.g., when using a touchscreen) or indirectly (e.g., when using a touchpad or a mouse).

BRIEF SUMMARY

One exemplary embodiment of the disclosed subject matter is a computer program product comprising a non-transitory computer readable storage medium retaining program instructions, which program instructions when read by a processor, cause the processor to perform a method comprising: obtaining a biometric feature of a user; selecting a data item from a plurality of data items, wherein each item in the plurality of data items is associated with a different biometric feature, wherein said selecting is based on the biometric feature; and using the data item in a program as part of an operation, wherein the operation depends on the current context of the program.

Optionally, the plurality of data items are encrypted, wherein each item in the plurality of data items is encrypted using the different biometric feature, wherein the method further comprises decrypting the data item using the biometric feature.

Optionally, the current context having a location, wherein the location is determined using a user input preceding said obtaining the biometric feature of the user.

Optionally, the current context is a context of filling a form, wherein said using comprises utilizing the data item to fill one or more fields in the form, whereby using different biometric features of the user, different data is filled in to the form.

Optionally, the current context is a context of pasting data, wherein a location where data is pasted to is determined based on a user action preceding said obtaining the biometric feature, wherein said using comprises pasting the data item, whereby using different biometric features of the user, different data is pasted.

Optionally, the plurality of data items are associated with the current context of the program, whereby using the same biometric feature of the user yields different data items in different contexts.

Optionally, biometric feature is a feature extracted from a fingerprint of the user.

Optionally, said obtaining is performed using an input device capable of obtaining the biometric feature from a fingerprint of the user.

Optionally, said using comprises using the data item in a location, wherein the location is determined using a user input preceding said using the input device, and without using the input device.

Optionally, the plurality of data items comprises: alternative credit card or debit card information of the user, wherein each alternative card information is selected based on the user providing a different body part from which the biometric feature is extracted.

Optionally, the plurality of data items comprises: alternative login information of the user, wherein each login information is selected based on the user providing a different body part from which the biometric feature is extracted.

Optionally, the plurality of data items comprises: alternative signatures of the user, wherein each signature is selected based on the user providing a different body part from which the biometric feature is extracted.

Optionally, said obtaining the biometric feature comprises obtaining the biometric feature from an input device that is configured to indirectly interact with a graphical user interface of the program.

Optionally, said obtaining, selecting and using are performed on a first device, wherein the data item is set to be associated with the biometric feature of the user on a second device.

Optionally, the data item is set to be associated with the biometric feature of the user by the user.

Another exemplary embodiment of the disclosed subject matter is a method comprising: obtaining user input causing a program in a mobile device to change context into a context, wherein in the context, information is to be inputted by a user; in response to the user providing a fingerprint sample, comparing the fingerprint sample against a set of pre-existing fingerprint samples of the user, wherein each pre-existing fingerprint sample corresponds a data item; in response to matching the fingerprint sample with a pre-existing fingerprint sample, retrieving a data item corresponding the pre-existing fingerprint sample; and providing the data item to be inputted in the context of the program.

Optionally, each pre-existing fingerprint sample corresponds an encrypted data item, wherein the encrypted data item is encrypted using the corresponding pre-existing fingerprint sample; wherein the method further comprises decrypting the data item using the fingerprint sample, whereby obtaining a decrypted data; and wherein said providing the data item comprises providing the decrypted data.

Yet another exemplary embodiment of the disclosed subject matter is a computerized apparatus comprising: a peripheral device for obtaining a biometric feature of a user; a memory retaining a plurality of data items, wherein each item in the plurality of data items is associated with a different biometric feature; a processor configured to select a data item from the plurality of data items, wherein the selection is based on the biometric feature; and wherein said processor is further configured to utilize the data item.

Optionally, the utilization of the data item depends on a context of the computerized apparatus.

Optionally, the plurality of data items are encrypted, wherein each item in the plurality of data items is encrypted using the different biometric feature, wherein said processor is further configured to decrypt the data item using the biometric feature.

Optionally, the plurality of data items are associated with a current context of the computerized apparatus, whereby using the same biometric feature of the user yields different data items in different contexts.

Optionally, the plurality of data items comprises at least one of: alternative credit card or debit card information of the user, wherein each alternative card information is selected based on the user providing a different body part from which the biometric feature is extracted; alternative login information of the user, wherein each login information is selected based on the user providing a different body part from which the biometric feature is extracted; and alternative signatures of the user, wherein each signature is selected based on the user providing a different body part from which the biometric feature is extracted.

Optionally, the plurality of data items are set to be associated with different biometric features by the user using a second device.

Optionally, the computerized apparatus is a mobile device and the second device is a second mobile device.

Optionally, the computerized apparatus is a device mounted on or installed in a vehicle, wherein the second device is a mobile device of the user.

Optionally, said memory is a remote memory accessible by the computerized device via a network connection.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
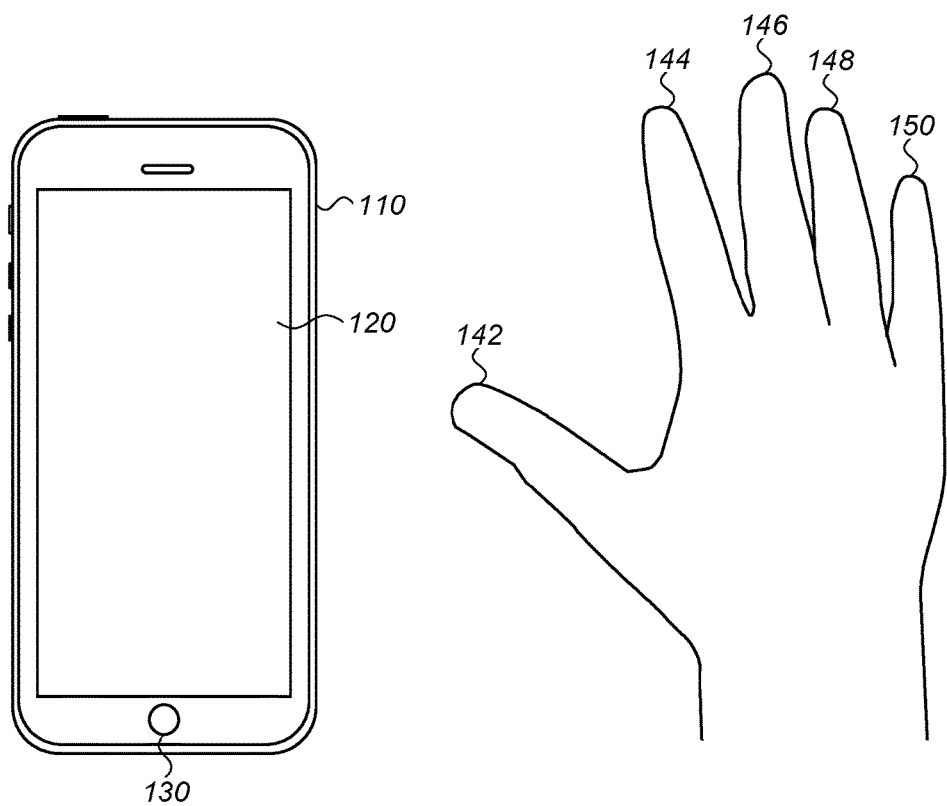
FIGS. 1A-1E show illustrations of computerized environments, in accordance with the disclosed subject matter.

One technical problem dealt with by the disclosed subject matter is to provide for a method of data retrieval. In some cases, data retrieval of confidential data is required to be secure and require some a-priori authorization. In some cases, the retrieved data may be data that is used frequently. Additionally or alternatively, it may be desired to provide for a relatively simple procedure to input data into a program. In some cases, the same procedure may be used to provide different data items in different circumstances.

One technical solution is to utilize biometric features of the user to select a data item. In some cases, the user may provide a biometric feature thereof, which is used to select one data item from a set of alternative potential data items to be used. As a biometric feature may be a feature that is hard to forge, such retrieval method provides inherent authorization prior to retrieving the data item.

As an example, fingerprints of the user may be used as the basis of the biometric features. Each finger of the user can be associated with a different data item, thereby allowing the user to select which data she wants to be used and retrieve it using the correct finger. For example, the user's business credit card information may be associated with her right index finger, while her personal credit card information may be associated with her right middle finger. The user's electronic signature may be accessible using her right ring finger, while her home address may be accessed using her left thumb.

Another technical solution is to use the data items in a predetermined manner that is based on the context of the program. In some cases, the program may be put into a context by a previous user-action. For example, the user may select a field and select "paste" operation, indicating that data is to be pasted. The user may then provide her biometric feature to select a data item to be pasted into the selected field. As another example, the program may include a form having multiple fields that can be filled. The context of the program may be a context of filling the form. If at such a time, the user provides her biometric features, the data may be obtained and the form filled using the data. As yet another example, the context of the program may be a log-in context, where the program requires logging in. The context may be set by the previous user action that launched the program or caused the program to reach a login page.

In some exemplary embodiments, the same biometric feature (e.g., fingerprint of the same finger) may be used to represent different data items in different contexts. For example, if a form in which credit card information is active in the program, each biometric feature may be associated with an alternative credit card information to be used. However, if the current context of the program is one where a single field is in focus, each finger may represent alternative single-line values.

In some cases, the association between biometric features and data items may be per general context, such as a context that is applicable to different programs. Additionally or alternatively, the association may be per specific context. The specific context may be specific to a program. In some cases, the specific context may be the identity of the program, such that the association may be based on the identity of the program being executed, displayed, shown in the foreground, or the like. Additionally or alternatively, the specific context may be a context of a program. For example, in a first program, the left middle finger may be associated with one data item in a first screen, and with a second data item in a second screen. The same left middle finger may also be associated with a third data item for a screen of a second program. In some exemplary embodiments, in case the program is a web browser, or another program that accesses resources via URLs, the URL may define the context (e.g., the entire URL, the domain name, a subdomain, the URL excluding parameters passed via GET method, or the like). It is noted that context granularity may be mixed, such that a general context may be used and in some cases may be overridden, such as when the user defined different information for a specific program, specific contexts within the program, or the like.

One technical effect of the disclosed subject matter is to provide a relatively simple user interface for selecting data items. The user may consider the information at "the palm of her hand", and by using the correct body part—e.g., finger, eye, palm, or the like—she may retrieve the data.

In some exemplary embodiments, the user may consider her body parts as storage device. The user may "store" information in her right index finger, and be able to retrieve and use such data when convenient, simply by using such finger. The user may thus consider the data as if it is being stored in her right index finger. In some cases, data stored on one device may be shared with other devices to be used thereby, enabling a personalized "cut" and "paste" operation from different devices as long as both operations are performed by the same user.

In some exemplary embodiments, the retrieval method may provide for secure retrieval which is contingent on the user using the device. Instead of relying on the user logging in to a system, such as by providing credentials, password, biometric feature or the like, the disclosed subject matter may ensure that only the authorized user retrieves and uses the data, even if the user had previously logged in to the system. For example, the user may log in to the system, and allow a friend to use her device. The friend may be authorized to perform all the actions that the user is authorized to perform. However, the friend may not be able to access the data items, as such retrieval requires the biometric features of the user herself.

In some exemplary embodiments, the disclosed subject matter may provide for granularity of privileges, such as enabling the system to define authorized user, but requiring additional information and authentication if the user wants to retrieve the data items.

In some exemplary embodiments, the disclosed subject matter enables a multi-user system, where each user is authorized to use the system, and each user has different data items available thereto. For example, Alice and Bob may both be authorized to use the same device and log into the device. In some cases, both users may log using the same credentials. Still, Alice's fingerprints may be used to retrieve different data items than that that are available to Bob.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIGS. 1A-1E, showing an illustration of a computerized environment, in accordance with the disclosed subject matter. In the illustrated embodiment, a mobile device, such as a smartphone, Personal Digital Assistant (PDA), tablet computer, or the like, is shown. However, the disclosed subject matter is not limited to such embodiment and can be used with other forms of devices, such as personal computers, laptops, or the like.

Additionally, the illustrated embodiment focuses on use of fingerprints as the biometric feature. However, the disclosed subject matter is not limited to such embodiment, and other biometric features may be used in addition to, or instead of, fingerprints.

Mobile Device 110 comprises a Screen 120, such as a touch screen. The user can interact directly with the GUI using Screen 120 or using another peripheral. Fingerprint Scanner 130, which may be located externally to Screen 120, at the bottom thereof, at the backside of Mobile Device 110, or in other similar locations, may be configured to obtain a fingerprint reading from a user.

The user may employ different fingers with Fingerprint Scanner 130, such as Thumb 142, Index Finger 144, Middle Finger 146, Ring Finger 148, Little Finger 150, or the like.

In some exemplary embodiments, in order to utilize Mobile Device 110, the user may require to provide credentials. In some exemplary embodiments, the credentials may include a password, a biometric measurement, or the like. In some exemplary embodiments, the biometric measurement may be a sampling of a fingerprint of the user. In some cases, the user may utilize a specific finger in order to authenticate herself and log in. Additionally or alternatively, the user may utilize any one of different fingers to log in, using Fingerprint Scanner 130. In such a case, a malicious user may log in using by spoofing Fingerprint Scanner 130 and providing a sample mimicking one of user's fingerprints, however, the malicious user may not have access to samples of other fingerprints of the user or may not otherwise be able to spoof the Fingerprint Scanner 130 with relation to other fingerprints. In some cases, the user may provide a fingerprint from her left hand for authentication and logging in to the system, and fingerprints of her right hand for selecting data items.

Figure 1C:
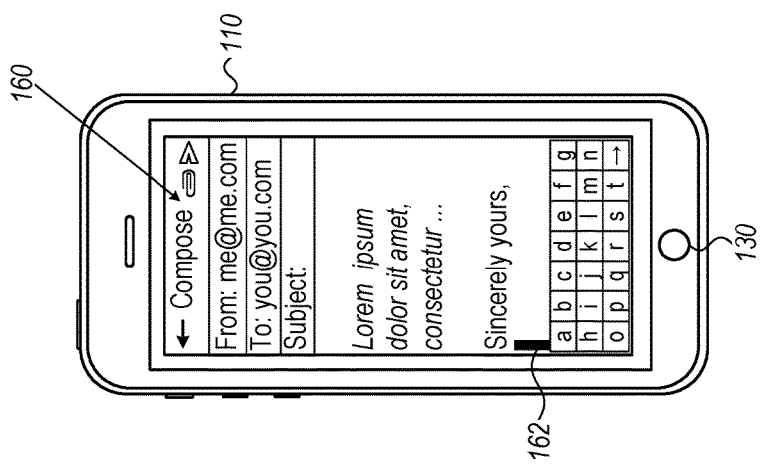
Figure 1B:
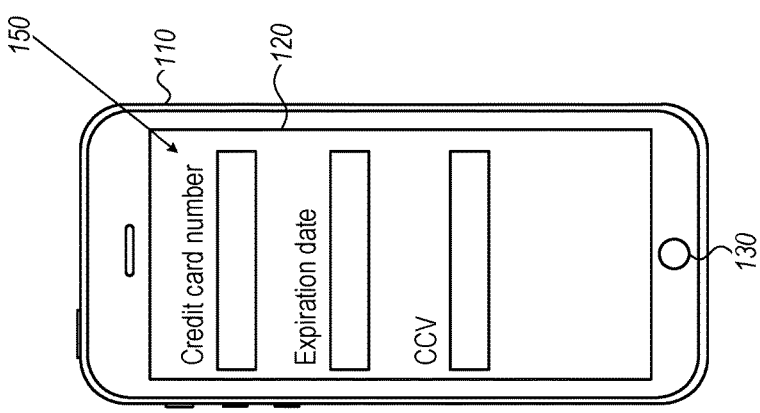

In FIG. 1B, Form 150 is shown in the GUI of Mobile Device 110. As an example, the form may be a web form shown in a browser. Additionally or alternatively, the form may be a form in a screen of an app or other program that is executed on Mobile Device 110. Form 150 may require inputting several different fields, such as credit card information. Similarly, debit card information may be inputted. As an example, the credit card information may include a number of the credit card, expiration date, and Credit Card Verification (CCV) number. Additionally or alternatively, the information may include name and identification number of the card holder, billing information, or the like.

The user may opt to manually input the data. However, instead, the user may provide a finger to be scanned by Scanner 130 in order to retrieve the relevant data. As an example, the user's personal credit card information may be associated with her right Thumb (142), while her business credit card information may be associated with her right Index Finger (144). Upon providing the fingerprint, a data repository may be accessed to retrieve the data item corresponding the fingerprint. The data repository may be stored locally on Mobile Device 110, may be stored remotely, such as on a remote server (not shown), or the like. In some cases, the query provides in addition to the fingerprint, a current context of the Mobile Device 110. The current context may be the active program that the user is interacting with (e.g., the program in which Form 150 is shown). Additionally or alternatively, the current context may be the context within the active program (e.g., having Form 150 be shown an active in the program). Additionally or alternatively, current context may be defined based on potential input, such as the names of the one or more fields that are in-focus, shown on screen, shown on the active form, or the like. Based on the fingerprint and potentially also the current context, data may be retrieved from the repository to be used. The data may be inputted into Form 150 automatically.

In some exemplary embodiments, the data item may be a record of credit card information. The record may comprise multiple fields. In some exemplary embodiments, the business card information may be inputted automatically. In some cases, the retrieved data item may comprise additional information not required by Form 150, such as billing address. Only a subset of the retrieved data, such as only a portion of the fields, may be utilized.

In FIG. 1C, Email Composer 160 is shown in the foreground. The user may perform a user action, such as touching Screen 120, using a pointing device, or the like, to indicate a location in the composed message. Following the user's interaction, a Curser 162 is shown at a current location. The user may scan a finger on Scanner 130 to provide information to be entered at the location of Curser 162. In some exemplary embodiments, the scanning operation may be used to retrieve a user's signature, such as one signature selected from a set of variety of signatures (e.g., personal, business, signatures associated with different organizations). In some exemplary embodiments, the signature may be hardcoded, such as include constant text, images, links, or the like, with predetermined and constant formatting. Additionally or alternatively, the signature or parts thereof may be generated dynamically, such as by including at predetermined locations within the signature, changing text, images, or the like. For example, the signature may be retrieved and indicate a location which is replaced by the organization's current slogan. Additionally or alternatively, an ad may be matched and inserted into the signature when the information is inputted.

In some exemplary embodiments, the user's interaction with Scanner 130 may not affect a location where the data is inserted or otherwise used. In some exemplary embodiments, the location is determined based on a previous action setting the current location (at Curser 162).

Figure 1E:
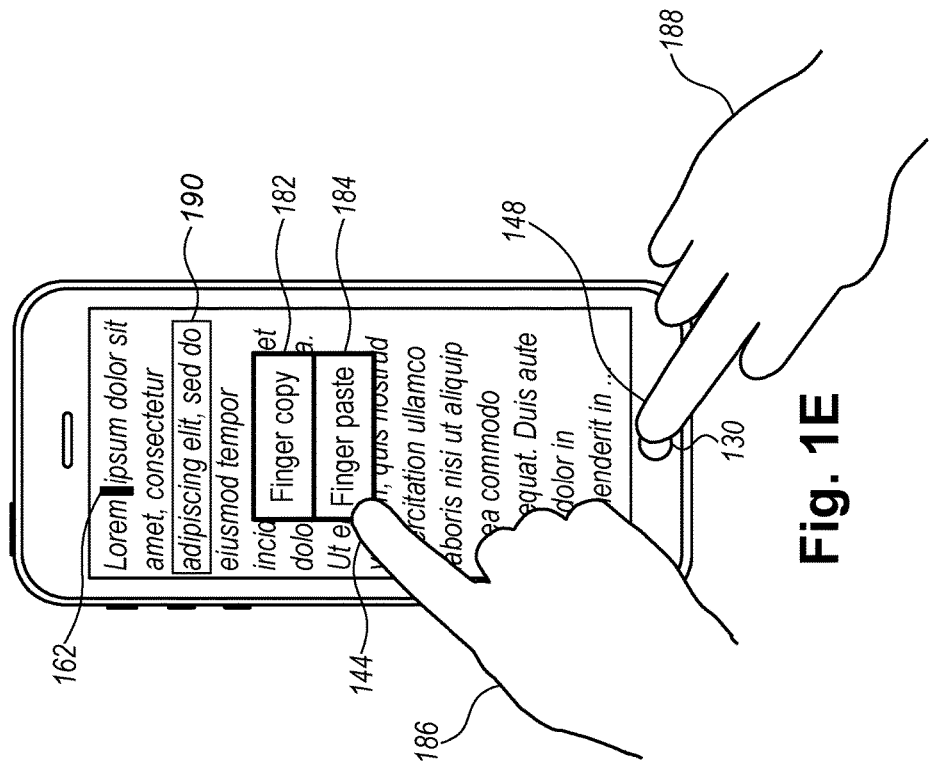
Figure 1D:
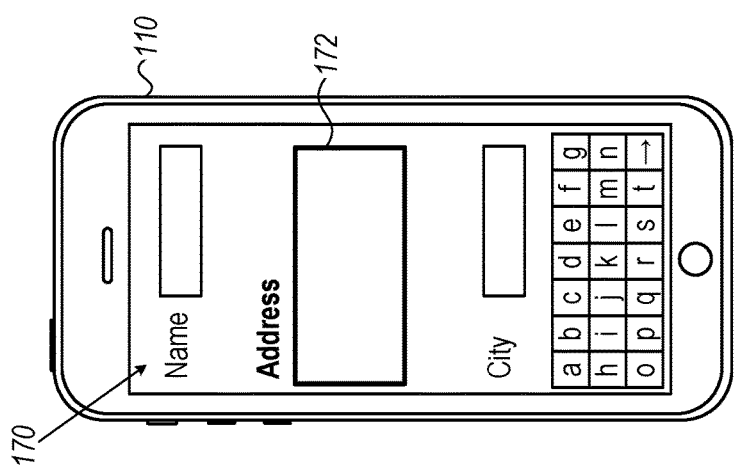

FIG. 1D shows Form 170 of an app comprising a plurality of fields. The user may select one field. The field that is selected, such as Field 172, may be considered the focused field. The current context of the app may accordingly be set to be Field 172. When the user provides her fingerprint, the data item that is retrieved may be inserted into Field 172. For example, the address information may be retrieved and inserted into Field 172. In some cases, however, if the retrieved record comprises fields that match the other potential input fields in the form, such as name, city, or the like, the entire form may be updated. In some exemplary embodiments, user's action may dictate whether to input information solely to the focused field (172) or to all relevant fields in a form that is presented in the foreground. For example, the user may place her finger on Scanner 130 for a longer period of time, if she wants the entire record to be used. Additionally or alternatively, the user may press against Scanner 130, as opposed to merely placing her finger, to indicate her selection of using the entire record.

In FIG. 1E, the user may select a portion of a text, Selected Text 190. Curser 162 may indicate a location in which text is to be entered. The location of Curser 162 may be set by a previous user action. In response to the user's selection of Selected Text 190, a contextual menu may be displayed. The contextual menu is illustrated as comprising Finger Copy 182 and Finger Paste 184 operations, however additional operations may be available, such as regular copy, cut, search or the like. The user may select Finger Copy 182 operation (186). The selection may indicate a context of the operation to be performed in response to retrieval of data items using fingerprints. The selection of Finger Copy 182 may be indifferent of the finger used. In some cases, the selection may be performed using a touch screen and using the same or a different finger than the finger to be scanned. Additionally or alternatively, the selection may be made using different peripherals, such as input devices having different modalities and not requiring the use of a finger at all.

After Finger Copy 182 is selected, the context is set to indicate that the next scanning operation would be used for a copy operation using a finger-associated clipboard. When the user provides her Ring Finger 148 to Scanner 130 (188), the clipboard associated with her Ring Finger 148 is accessed and Selected Text 190 is copied thereto.

When the user selects Finger Paste 184 operation, the paste operation is performed with respect to the data in the finger-associated clipboard of the finger that is used. For example, if the user provides her Ring Finger 148, the same copied text of Selected Text 190 is pasted. If the user provides another finger, a different clipboard is used and its content is pasted.

In some exemplary embodiments, the clipboards may be associated with specific body parts, such as right ring finger, left index finger, or the like, or a group of body parts, such as ring fingers (left or right), eyes (left or right), or the like.

In some exemplary embodiments, the finger-associated clipboard may be stored remotely in addition to or instead of being stored locally. When the data item is retrieved, if the data item is not available locally, a remote storage may be queried to obtain the data. In some exemplary embodiments, the user may copy the information to a finger-associated clipboard in one device, and paste it in a second device, in a manner that does not require the user to explicitly send the data to the second device. In some exemplary embodiments, such an embodiment increases the overall impression that the data is stored in the finger, as the user may change devices and still use the data.

In some exemplary embodiments, the disclosed subject matter may be employed to retain and use multiple alternative login credentials such as passwords and usernames. When the device is in a login context, such as when the device itself needs to be authenticated, when the user logs into an app or service, or the like, the biometric feature may be used to select login credentials. For example, login credentials of a first account in an email service may be associated with the index finger, while the credentials of a second account in the email service (or another service) may be associated with the thumb. The fingerprints may be used not only to obtain or replace a password, but also to provide the username, username, account number, or other identifying information used in the login process.

Figure 2:
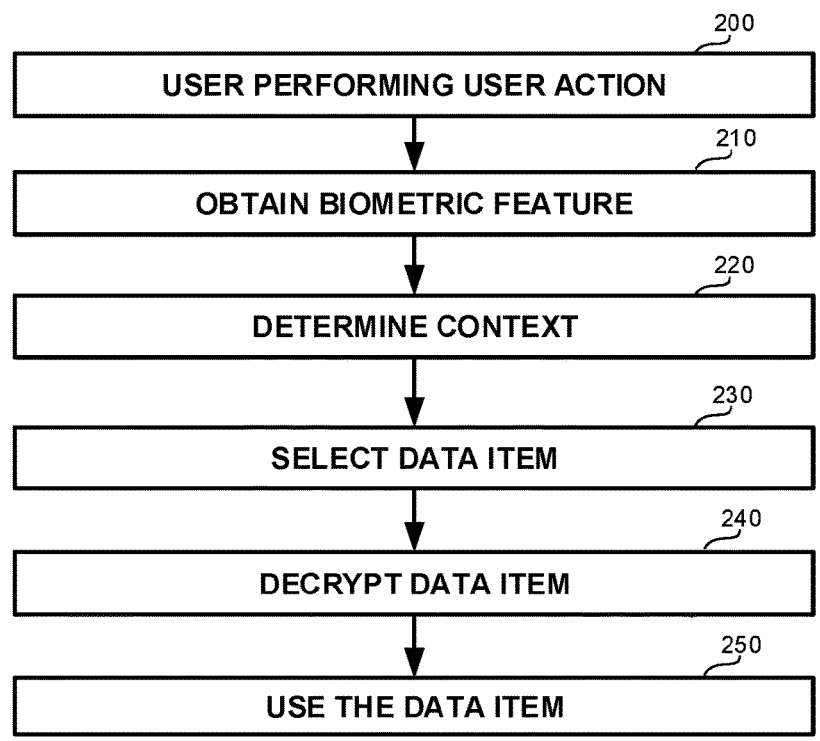
FIG. 2 shows a flowchart diagram of a method, in accordance with some exemplary embodiments of the disclosed subject matter.

Referring now to FIG. 2 showing a flowchart of a method, in accordance with some exemplary embodiments of the disclosed subject matter.

On Step 200, the user performs a user action, setting a device into a context. The user may perform the user action using any input device having any modality. The user action may set a location of a next action to be performed, such as determining a location of a curser. In some exemplary embodiments, the user action may be to select a field to be focused. Additionally or alternatively, the user action may be select an operation to be performed (e.g, paste operation using a finger-associated clipboard). Additionally or alternatively, the user action may be to open an app, to open a window in the app, or the like.

On Step 210, the user may provide a reading of a biometric feature, such as a scanning of a fingerprint of a finger. In some exemplary embodiments, the scanning operation may be performed using a peripheral of the device, which is located near or on the display. In some exemplary embodiments, the scanning operation may be performed on the display itself, however the location of the operation may be irrelevant to the use thereof. For example, the scanning operation of a fingerprint may be performed on the screen itself, without affecting the current location, cursor location, or the like.

In some exemplary embodiments, the user may provide a sequence of biometric features, such as her right index finger, followed by her right ring finger. The disclosed subject matter may associate a sequence of biometric features with a data item. As an example, the user may provide biometric features of her fingers that are used for the V gesture (either in a sequence or at the same time), and such biometric features may be used to retrieve a contact information of the user. In some cases, third parties may desire to be associated with a single notable sequence, such as the V gesture, a sequence of three taps by the little finger, or the like.

On Step 220, a current context of the device may be determined. The current context may be selected from a default context and alternative contexts which may override the default context. The alternative contexts may comprise contexts indicating the program that is being used, that program that is in the foreground, the program that has focus, or the like. In some exemplary embodiments, there may be a default alternative context for a program, which may be overridden by concrete alternative contexts within the program. The concrete alternative contexts may be contexts depending on the focused form, depending on the focused field, or the like. In some exemplary embodiments, the context may depend on potential user input, such as based on the names of the fields of the form that has focus, based on the name of the focused field, or the like. In some exemplary embodiments, different screens of forms may share a same context. Additionally or alternatively, the context may be extracted from a URL that is shown or used by the program, such as the URL of the displayed page of a web browser.

In some exemplary embodiments, each context may be associated with a type of input to be provided, such as signature, credit/debit card information, address, or the like. The association between the context and the type of input may be based on user-defined associations of the user, of an administrator, of a vendor of a system in accordance with the disclosed subject matter, or the like. The association may be automatic, such as by automatically determining the type of information to be inputted. The automatic determination may be performed using machine learning. For example, a machine learning algorithm may be employed to determine that at the current cursor location, it is likely the user would input her signature, as opposed to a different location where she is expected to input her mailing address.

On Step 230, a data item may be selected. The selection may be performed with respect to a repository comprising for each biometric feature different data items. In some exemplary embodiments, the repository may be a table mapping fingerprints and records corresponding thereto. Additionally or alternatively, the selection may be based on the context. The repository may map each context to a table, mapping fingerprints and records corresponding thereto. In some exemplary embodiments, there may be different context granularities, abstraction levels, or otherwise there may be different alternative contexts that are determined at the same time. The selection may be performed so as to first select a table. If there are several potential tables corresponding alternative current contexts, the selection of a table may be performed in accordance with a predetermined order. For example, concrete context may override abstract contexts, and hence if a concrete context has an associated table such table may be used instead of the table that corresponds the abstract context. Different orderings may be defined and utilized.

The data item may be retrieved from a digital memory, storage, or the like. In some exemplary embodiments, the repository may identify the location where the data item is being digitally retained. In some exemplary embodiments, the repository and the data items may be retained in the same media. Additionally or alternatively, the repository and the data items may be retained in different medias. In some exemplary embodiments, the repository may be retained locally, and the data items themselves may be retained in a remote location, to reduce storage requirements. In some exemplary embodiments, the repositories may be replicated over different devices, so as to enable different devices to use the disclosed subject matter. The data items may be retrieved on demand from a remote data storage, and retained locally thereafter. In some exemplary embodiments, the data items and repository may be replicated and duplicate copies thereof may be retained on different devices. In some exemplary embodiments, when the user logs in into a device, if the repository and data items are not retained locally, the device may automatically retrieve the repository and data items to allow the user to utilize the data items in accordance with the disclosed subject matter.

In some exemplary embodiments, the data items may be complex objects that can be transformed, modified, or otherwise manipulated to provide different useful data in different contexts. As an example, the data item may be a contact object comprising the contact's name, address, mobile number, facebook handle, email address, or the like. If the data item is used within a dialer program, the mobile number may be extracted and the dialer may dial to the mobile number. If, on the other hand, the context is of an email program, the contact's email address may be inputted into a new composed email. As another example, the same contact information may be used in a navigation application, such as GOOGLE MAPS™ or WAZE™. In such a case, the address of the contact person may be used as the destination. As another example, the object may be an image of the contact's business card and the information may be extracted therefrom using Optical Character Recognition (OCR). In some contexts, the image itself may be used.

On Step 240, the data item may be decrypted. In some exemplary embodiments, the data items may be encrypted. In some exemplary embodiments, the encryption may be based on the biometric feature. For example, the same biometric feature extracted from the fingerprint that is used to select the data item in Step 230, may also be as a symmetric key used to encrypt the data item. Additionally or alternatively, different biometric features extracted from the same fingerprint may also be used, such that one feature is used as the retrieval key and the other is used as the encryption key.

On Step 250, the data item may be used. The data item may be used as part of an operation of a program being executed by the device. In some exemplary embodiments, the operation may depend on the context of the current program. In some exemplary embodiments, the operation may be performed with respect to a location which was determined based on the user action of Step 200.

In some exemplary embodiments, in case the context may be a context of filling a form. The data item may be used to fill one or more fields of the form. As a result, if the same user provides different biometric features, different data may be filled into the form.

Additionally or alternatively, the context may be a context of pasting data, such as a "Finger Paste" operation (184). The data may be pasted to a location determined based on an action preceding the user providing her biometric feature (e.g., preceding Step 210). The data item or portion thereof may be pasted to the location. As a result, if the same user provides different biometric features, different data may be pasted. In some exemplary embodiments, the data item may be an identifier of a finger-associated clipboard from which data is retrieved.

Additionally or alternatively, the context may be a context of copying data, such as "Finger Copy" operation (182). The data may be copied from a selection that is made in an action preceding the user providing her biometric features (e.g., in the action of Step 200). On Step 230, one clipboard out of a set of alternative clipboards, such as finger-associated clipboards, may be selected based on the biometric feature. The selected clipboard may be used to retain the information copied in the "Finger Copy" operation. In some exemplary embodiments, the content of the clipboard may be transmitted to other devices, such as to a server, to other devices where the user is logged in, other devices that are associated with the user, or the like.

Additionally or alternatively, the data may be used to perform a login operation. The data item may be used to retrieve user credentials comprising two or more items, such as an identifier item and a password item. In some exemplary embodiments, the data item may be a record comprising the user credentials, such as comprising a field retaining a user name, an account identifier, or the like, and a field comprising a password, such as textual password, pattern password, or the like. In some exemplary embodiments, the current context may be a context of performing log-in into a system, the device, a program, a service, or the like. On Step 250, the credentials may be used to log in.

In some exemplary embodiments, based on the context, a manipulation of the object may be performed to provide a subset of the retrieved data item, or information based thereon, to be used in the current context, such as providing the information of the magnetic stripe of the credit card in a context of a barcode reader, and providing the textual information of the credit card number and expiration date and CCV, in case of a form to be filled.

In some exemplary embodiments, the use of the same data item may be different in different contexts. For example, a phone number may be inputted to a field in a fill form context and may be dialed in a dialing context of a dialer program.

Figure 3:
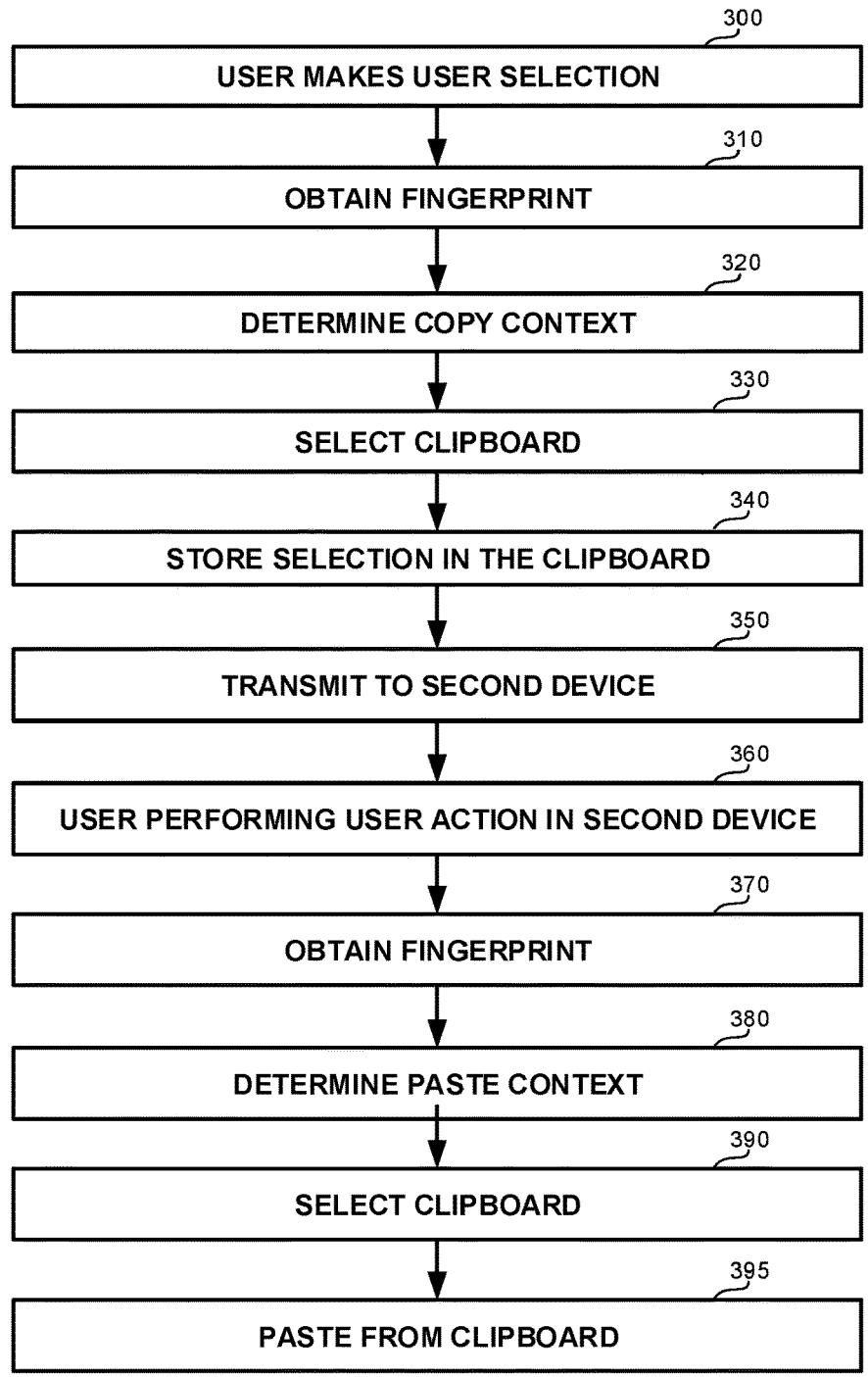
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter. FIG. 3 depicts an embodiment of copy-paste operations using user's fingerprints.

On Step 300, a user makes a selection of content. The selection may be performed using touchscreen, using a mouse, a keyboard, speech, gestures, or using any other interaction method.

On Step 310, the user may provide her fingerprint to be scanned. The fingerprint may be scanned to obtain a biometric feature of the fingerprint.

On Step 320, a copy context may be determined. The copy context may be determined based on a user action, such as the user selecting a copy operation from a menu. However, the context may be determined using other methods.

On Step 330, a clipboard may be selected based on the biometric feature. In some exemplary embodiments, the clipboard may be a finger-associated clipboard. The association between the biometric feature and clipboards may be performed using a mapping between biometric features and clipboards.

On Step 340, the selected content may be copied into the selected clipboard. In some exemplary embodiments, the data is copied verbatim. Additionally or alternatively, the content of the clipboard may be encrypted using a key. The key may be an encryption key, such as user defined password, credentials, or the like. Additionally or alternatively, the key may be the biometric feature used to select the clipboard.

On Step 350, the content of the clipboard may be transmitted to a second device. The content may be transmitted to the second device directly or indirectly, such as via a server. In some exemplary embodiments, the transmission may occur immediately or in a later time.

On Step 360, the user may perform a user action in the second device. The user action may set the second device into a context of pasting data from one of the finger-associated clipboard.

On Step 370, the user may provide the fingerprint of the same finger to be scanned in the second device. The fingerprint may be scanned to obtain a biometric feature of the fingerprint.

On Step 380, it may be determined that the current context is a paste context.

On Step 390, the clipboard may be selected, such as in a similar manner to the selection on Step 330. As the same biometric feature is used, the same clipboard may be obtained. It is noted that in some cases, the clipboard may be context-dependent, such as having a different clipboard for different programs.

On Step 395, the content of the clipboard may be used and pasted. The content may be pasted into a location set by the user action of Step 360. In some exemplary embodiments, the content may be decrypted prior to being pasted, such as using the biometric feature as a decryption key.

In one embodiment of the disclosed subject matter, the disclosed subject matter may be used to store and retrieve passwords that are hard for users to memorize. Strong passwords may be passwords having no meaning, combining different letters, digits and special characters, and comprising a large number of characters. However, such passwords may be hard to memorize. A user may select a finger to be associated with her password. Different passwords may be associated with different programs. In a create-password context, using the finger may be automatically identified as a request to generate a strong password, paste the generated password to the appropriate field (or fields, such as in case of a form requiring password verification), and store the password as a data item associated with the finger in a login context of the same program, site, service, or the like. When the user wishes to login using the password, she need not remember the password at all. Instead, she needs to remember which of her fingers is associated with the password for the specific program, site, service or the like. In some exemplary embodiments, the finger and the login context of a specific program, site or service are used together in order to retrieve the password and paste it to the correct input field. It is noted that the program, site, service, or the like, need not be aware of the use of the user's finger for providing the password. There is no need for each login process to be specifically designed to work with biometric features. Instead, the disclosed subject matter is used to link the biometric feature with a different password modality that is being used by the program. In the present example, using password-based identification which is more common and widespread than a fingerprint-based identification.

In one exemplary embodiment of the disclosed subject matter, the disclosed subject matter may be used in a plurality of devices, which may be different than one another. As an example, the user may define fingerprint mapping on her mobile phone, and utilize such mapping in her car. The user may provide a fingerprint reading by placing her finger on a peripheral device in the car, such as a device embedded within the wheel. The device that is being used, such as the user's car, may be part of the context. In some cases, an object of a contact person may be retrieved based on the user's fingerprint, and as the context is that of a car, the physical address may be used to set a destination in the vehicle's navigation system. As another example, if a destination is already set, or if the vehicle is already in motion, the contact's phone number may be extracted and dialed to. In some cases, the system may provide an audible feedback for the user to indicate its action. In some cases, the user may verify the action is acceptable before being executed. As yet another example, the user may provide a first fingerprint to retrieve the data item of the contact, and a second fingerprint to retrieve an action to be taken with the data item. As an example, the user's index finger may indicate set a new destination, the user's ring finger may indicate set a new waypoint, the user's middle finger may indicate dial number. In some cases, if the user does not follow her first input of fingerprint with a second one, the system may perform a default action. In some cases, the default action may be predetermined and hard-coded, such as based on the context of the vehicle. As another example, the default action may be determined by a machine learning classifier that may be trained over time and based on the user's activity to predict the user's intent. For example, the prediction of the action to be taken may be based on features such as vehicle's speed, vehicle's location (e.g., exact location, located on a highway, on a street with a relatively low speed limit, such as 50 KPH, 30 KPH, or the like), the contact person, the status of the navigation system (e.g., route set, percent of the route traveled), status of the radio (e.g., quality of reception indicator, current station), or the like. Every time the user provides an explicit selection of an action, the features may be determined and used together with a label of the action as part of a training set for the classifier. The classifier may be trained periodically, iteratively, or the like. In some exemplary embodiments, after a prediction is made and an action is predicted and performed, the user may abort the action, to indicate a wrong prediction, thereby providing additional training data to improve the prediction of the classifier.

In some exemplary embodiments, the disclosed subject matter may be implemented as an Software Development Kit (SDK) that can be used by third parties. In some cases, Application Program Interface (API) may be provided to enable third parties to utilize the functionality provided by the disclosed subject matter, such as set a context, set association of fingerprint with data item, retrieve data item based on fingerprint or based on fingerprint and context, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a non-transitory computer readable storage medium retaining program instructions, which program instructions when read by a processor, cause the processor to perform a method, wherein the processor is capable of executing different programs, wherein the method comprising:
   obtaining a biometric feature of a user;
   selecting a data item from a plurality of data items, wherein each item in the plurality of data items is associated with a different biometric feature, wherein said selecting the data item is based on the biometric feature of the user; and
   using the data item in a program as part of an operation, wherein the program is executed by the processor, wherein the operation depends on a current context of the program, whereby different results are achieved for a same data item in different contexts of the program.

2. The computer program product of claim 1, wherein the plurality of data items are encrypted, wherein each item in the plurality of data items is encrypted using the different biometric feature of the user, wherein the method further comprises decrypting the data item using the biometric feature.

3. The computer program product of claim 1, wherein the current context of the program having a location in a display, wherein the location in the display is determined using a user input preceding a user input utilized in said obtaining the biometric feature of the user, whereby said using the data item is performed so as to modify the display at the location in the display.

4. The computer program product of claim 1, wherein the current context of the program is a context of filling a form in the program, wherein in the context of filling the form, comprises displaying to the user a form to be filled by the user, wherein the form to be filled comprises a plurality of input fields, wherein said using comprises utilizing the data item to fill one or more of the plurality of input fields in the form, whereby the form is filled, at least in part, automatically instead of manually, whereby using different biometric features of the user, different data is filled in to the form.

5. The computer program product of claim 1, wherein the current context is a context of pasting data, wherein a location where data is pasted to is determined based on a user action preceding a user action used in said obtaining the biometric feature, wherein said using comprises pasting the data item to the location, whereby using different biometric features of the user, different data is pasted.

6. The computer program product of claim 1, wherein the plurality of data items are associated with the current context of the program, whereby using the same biometric feature of the user yields different data items in different contexts.

7. The computer program product of claim 1, wherein biometric feature is a feature extracted from a fingerprint of the user.

8. The computer program product of claim 1, wherein said obtaining is performed using an input device capable of obtaining the biometric feature from a fingerprint of the user.

9. The computer program product of claim 8, wherein said using comprises using the data item in a location in a display, wherein the location in the display is determined without using the input device capable of obtaining the biometric feature that is in said obtaining the biometric feature of the user.

10. The computer program product of claim 1, wherein the plurality of data items comprises: alternative credit card or debit card information of the user, wherein each alternative card information is selected based on the user providing a different body part from which the biometric feature is extracted.

11. The computer program product of claim 1, wherein the plurality of data items comprises: alternative login information of the user, wherein each login information is selected based on the user providing a different body part from which the biometric feature is extracted.

12. The computer program product of claim 1, wherein the plurality of data items comprises: alternative signatures of the user, wherein each signature is selected based on the user providing a different body part from which the biometric feature is extracted, wherein the current context of the program is a context of composing a communication, wherein the communication ends with a human-readable signature of a composing user of the communication.

13. The computer program product of claim 1, wherein said obtaining the biometric feature comprises obtaining the biometric feature from an input device that is configured to indirectly interact with a graphical user interface of the program.

14. The computer program product of claim 1, wherein said obtaining, selecting and using are performed on a first device, wherein the first device comprising the peripheral device for obtaining the biometric feature of the user, wherein the data item is set to be associated with the biometric feature of the user on a second device that is operated by the user.

15. The computer program product of claim 14, wherein the data item is set to be associated with the biometric feature of the user by the user.

16. A method comprising:
obtaining user input causing a program in a mobile device to change context from a first context into a second context, wherein in the second context, information is to be inputted by a user;
in response to the user providing a fingerprint sample, comparing the fingerprint sample against a set of pre-existing fingerprint samples of the user, wherein each pre-existing fingerprint sample corresponds a data item;
in response to matching the fingerprint sample with a pre-existing fingerprint sample, retrieving a data item corresponding the pre-existing fingerprint sample; and
inputting the data item in the second context of the program, wherein said inputting is affected by the second context, whereby different results are achieved for a same data item in different contexts.

17. The method of claim 16,
wherein each pre-existing fingerprint sample corresponds an encrypted data item, wherein the encrypted data item is encrypted using the corresponding pre-existing fingerprint sample of the user;
wherein the method further comprises decrypting the data item using the fingerprint sample, whereby obtaining a decrypted data;
wherein said inputting the data item comprises inputting the decrypted data.

18. A computerized apparatus comprising:
a peripheral device for obtaining a biometric feature of a user;
a memory retaining a plurality of data items, wherein each item in the plurality of data items is associated with a different biometric feature;
a processor configured to select a data item from the plurality of data items, wherein the selection is based on the biometric feature; and
wherein said processor is further configured to utilize the data item based on a current context of the computerized apparatus, whereby different results are achieved for a same data item in different contexts of the computerized apparatus.

19. The computerized apparatus of claim 18, wherein the plurality of data items are encrypted, wherein each item in the plurality of data items is encrypted using the different biometric feature of the user, wherein said processor is further configured to decrypt the data item using the biometric feature.

20. The computerized apparatus of claim 18, wherein the plurality of data items are associated with a current context of the computerized apparatus, whereby using the same biometric feature of the user yields different data items in different contexts.

21. The computerized apparatus of claim 18, wherein the plurality of data items comprises at least one of:
alternative credit card or debit card information of the user, wherein each alternative card information is selected based on the user providing a different body part from which the biometric feature is extracted;
alternative login information of the user, wherein each login information is selected based on the user providing a different body part from which the biometric feature is extracted; and
alternative signatures of the user to be provided in a human-readable form as part of a communication composed by the user, wherein each signature is selected based on the user providing a different body part from which the biometric feature is extracted.

22. The computerized apparatus of claim 18, wherein the plurality of data items are set to be associated with different biometric features by the user using a second device, wherein the second device comprises a second peripheral device for obtaining a biometric feature of a user using the second device, whereby data is shared between the second device and the computerized apparatus based on a user action in the second device, and whereby the user is capable of utilizing shared data in the computerized apparatus.

23. The computerized apparatus of claim 22, wherein the computerized apparatus is a mobile device and the second device is a second mobile device.

24. The computerized apparatus of claim 22, wherein the computerized apparatus is a device mounted on or installed in a vehicle, wherein the second device is a mobile device of the user.

* * * * *